(No Model.)
J. SCOTT, Jr.
LINK.
No. 340,158.  Patented Apr. 20, 1886.
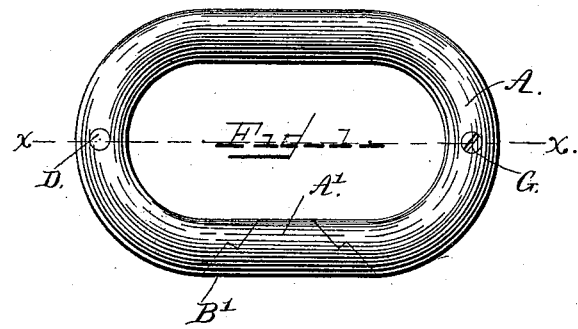
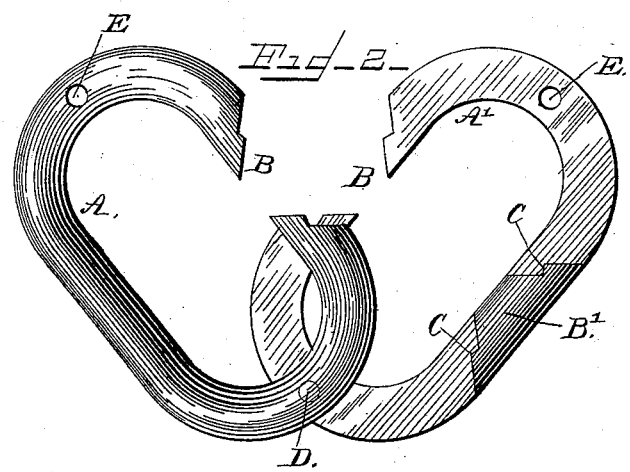
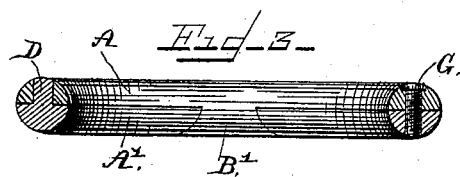
WITNESSES
R. W. Bishop.
Pearl Kramer.
James Scott, Jr.
INVENTOR
by R. S. & A. P. Lacey
Attorneys.

UNITED STATES PATENT OFFICE.

JAMES SCOTT, JR., OF MENOMINEE, MICHIGAN.

LINK.

SPECIFICATION forming part of Letters Patent No. 340,158, dated April 20, 1886.

Application filed September 29, 1885. Serial No. 178,560. (No model.)

*To all whom it may concern:*

Be it known that I, JAMES SCOTT, Jr., a citizen of the United States, residing at Menominee, in the county of Menominee and State of Michigan, have invented certain new and useful Improvements in Links; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is intended to supply a link which may be quickly applied to broken chains; and it consists in certain novel features hereinafter described and claimed.

In the drawings, Figure 1 is a plan view of the link closed. Fig. 2 is a plan view of the same open; and Fig. 3 is a sectional view on the line X X, Fig. 1.

The link is composed of two half-links, A A', which are of the same construction. These half-links have one flat side and one round side, as shown. Midway their ends I cut away a portion of one side, as shown at B. The link-halves are cut away on opposite sides, and on each half opposite the cutaway portion I provide the shoulder or raised portion B', which corresponds to the cutaway portion B, and engages the same in the operation of the device. The sides of this raised portion are placed at an angle to the direction of the length of the link, as shown, and they are each provided with a ledge, C. The construction of the cutaway portion is similar to that of the raised portion, as will be readily understood.

When the two link-halves are placed together, the raised and cutaway portions will engage and effectually prevent the two halves slipping past each other.

The half-link A' is provided at one end with a pivot-pin, D, which enters a suitable opening in the half-link A. At the opposite end of the link I provide the link-halves with coincident openings F F, through which I insert a screw, G, in the operation of the device.

When it is desired to use my device, the two half-links are swung apart on the pivot-pin D, as shown in Fig. 2. The end links of the chain are then placed in my link through the open cutaway portion B. The two half-links are then swung around together and fastened by the screw G, as shown in Figs. 1 and 3.

It will thus be seen that my link takes the place of the broken link in the chain.

My device is simple in its application, and the advantages derived from its use are obvious.

Having thus described my invention, what I claim, and desire to secure by Letters Patent, is—

1. A link composed of two half-links pivoted together at one end, each half-link having a portion cut from one side to provide an opening, and having on its other side, opposite its said opening, a raised portion adapted to fit into and close the opening in the side of the other half-link when the two halves are shut together, substantially as shown and described.

2. The herein-described link, composed of two half-links pivoted together at one end, each having a portion cut from the side thereof, presenting outwardly-inclined ends, and a corresponding raised portion opposite the intercepted ends, for the purposes described, and a screw to fasten the opposite ends together, substantially as set forth.

In testimony whereof I affix my signature in presence of two witnesses.

JAMES SCOTT, JR.

Witnesses:
I. STEPHENSON, Jr.,
C. S. BROWN.